(12) United States Patent
Atif et al.

(10) Patent No.: US 9,979,941 B2
(45) Date of Patent: May 22, 2018

(54) IMAGING SYSTEM USING A LENS UNIT WITH LONGITUDINAL CHROMATIC ABERRATIONS AND METHOD OF OPERATING

(75) Inventors: Muhammad Atif, Stuttgart (DE); Muhammad Siddiqui, Stuttgart (DE); Christian Unruh, Stuttgart (DE); Markus Kamm, Stuttgart (DE)

(73) Assignee: Sony Corporation, Tokyo (JP)

( * ) Notice: Subject to any disclaimer, the term of this patent is extended or adjusted under 35 U.S.C. 154(b) by 334 days.

(21) Appl. No.: 13/977,854

(22) PCT Filed: Jan. 13, 2012

(86) PCT No.: PCT/EP2012/000143
§ 371 (c)(1),
(2), (4) Date: Jul. 1, 2013

(87) PCT Pub. No.: WO2012/095322
PCT Pub. Date: Jul. 19, 2012

(65) Prior Publication Data
US 2013/0278726 A1    Oct. 24, 2013

(30) Foreign Application Priority Data

Jan. 14, 2011 (EP) .................................. 11000283
May 2, 2011 (EP) .................................. 11003573

(51) Int. Cl.
*H04N 5/225* (2006.01)
*H04N 5/335* (2011.01)
(Continued)

(52) U.S. Cl.
CPC ........... *H04N 9/646* (2013.01); *H04N 5/3572* (2013.01); *H04N 9/045* (2013.01); *H04N 5/332* (2013.01)

(58) Field of Classification Search
USPC ............................................ 348/46, 79, 239
See application file for complete search history.

(56) References Cited

U.S. PATENT DOCUMENTS 6,934,408 B2 * 8/2005 Frost .................... C12Q 1/6816
356/39
7,493,039 B2    2/2009 Yamamoto
(Continued)

OTHER PUBLICATIONS

Oliver, C., et al., "Spectral Focal Sweep: Extended Depth of Field from Chromatic Aberrations," IEEE, Total 8 Pages, (Mar. 29, 2010) XP 002676337.

(Continued)

*Primary Examiner* — Jorge L Ortiz Criado
*Assistant Examiner* — Susan E Hodges
(74) *Attorney, Agent, or Firm* — Oblon, McClelland, Maier & Neustadt, L.L.P.

(57) ABSTRACT

A lens unit of an imaging unit features longitudinal chromatic aberration. From an imaged scene, an imaging sensor unit captures non-color-corrected first images of different spectral content. An intensity processing unit computes broadband luminance sharpness information from the first images on the basis of information descriptive for imaging properties of the lens unit. A chrominance processing unit computes chrominance information on the basis of the first images. A synthesizing unit combines the computed chrominance and luminance information to provide an output image having, for example, extended depth-of-field. The imaging unit may be provided in a camera system, a digital microscope, as examples.

16 Claims, 16 Drawing Sheets

(51) Int. Cl.
*H04N 9/04* (2006.01)
*G06K 9/00* (2006.01)
*G02B 9/00* (2006.01)
*H04N 9/64* (2006.01)
*H04N 5/357* (2011.01)
*H04N 5/33* (2006.01)

(56) References Cited

U.S. PATENT DOCUMENTS

| | | | |
|---|---|---|---|
| 7,626,769 B2 | 12/2009 | Olmstead et al. | |
| 7,683,950 B2* | 3/2010 | Kelly | H04N 1/58 348/252 |
| 7,792,357 B2* | 9/2010 | Kang | H04N 1/4092 382/162 |
| 8,760,756 B2* | 6/2014 | Price | G02B 21/0016 359/368 |
| 2006/0054782 A1* | 3/2006 | Olsen | G02B 3/0062 250/208.1 |
| 2008/0158377 A1* | 7/2008 | Chanas | H04N 5/232 348/222.1 |
| 2009/0021739 A1* | 1/2009 | Tsujita | A61B 1/00163 356/407 |
| 2009/0052769 A1* | 2/2009 | Kang | H04N 9/045 382/162 |
| 2009/0141140 A1* | 6/2009 | Robinson | G02B 13/0025 348/222.1 |
| 2009/0167738 A1* | 7/2009 | Gotanda | H04N 5/23212 345/207 |
| 2009/0189997 A1* | 7/2009 | Stec | H04N 17/002 348/222.1 |
| 2009/0263018 A1* | 10/2009 | Murakami | G06T 3/0093 382/167 |
| 2010/0276736 A1* | 11/2010 | Bocko | H01L 27/14632 257/291 |
| 2010/0315541 A1* | 12/2010 | Egawa | H01L 27/14621 348/294 |
| 2011/0080487 A1* | 4/2011 | Venkataraman | H04N 5/2253 348/218.1 |

OTHER PUBLICATIONS

Guichard, F., et al., "Extended depth-of-field using sharpness transport across color channels," SPIE-IS&T, vol. 7250, Total 12 Pages, (2009) XP 002676338.

Parmar, M., et al., "Interleaved Imaging: An Imaging System Design Inspired by Rod-cone Vision," SPIE-IS&T, vol. 7250, Total 8 Pages, (2009) XP 002676339.

Written Opinion of the International Searching Authority dated Jun. 5, 2012 in PCT/EP12/000143 Filed Jan. 13, 2012.

International Search Report dated Jun. 5, 2012 in PCT/EP12/000143 Filed Jan. 13, 2012.

* cited by examiner

IMAGING SYSTEM USING A LENS UNIT WITH LONGITUDINAL CHROMATIC ABERRATIONS AND METHOD OF OPERATING

The present invention relates to the field of post-capture digital image processing techniques. An embodiment relates to an imaging system that includes a non-colour-corrected lens unit with longitudinal chromatic aberrations and a processing unit for post-capture digital image processing. A further embodiment refers to a method of operating an imaging system that includes a non-colour-corrected lens unit with longitudinal chromatic aberrations.

F. Guichard et al., "Extended Depth-of-Field using Sharpness Transport across Colour Channels", SPIE, Proceedings of Electronic Imaging, 2009, refers to a method of obtaining images with extended depth-of-field where, for a given object distance, at least one colour plane of an RGB image contains the in-focus scene information. Oliver Cossairt et al., "Spectral Focal Sweep: Extended Depth of Field from Chromatic Aberrations", IEEE International Conference on Computational Photography (ICCP), March 2010, provide a spectral focal sweep camera that deconvolves a binary image obtained with a lens with large longitudinal chromatic aberrations to restore an image with extended depth of field. Shen, C. H. and Chen, H H, "Robust focus measure for low-contrast images", International Conference on Consumer Electronics (ICCE), 2006 suggest using a Discrete Cosine transform energy measure for evaluating focus and sharpness information.

Manu Parmar and Brian Wandell, "Interleaved Imaging: An Imaging System Design Inspired by Rod-Con Vision", Proceedings of SPIE, 2009, propose an imaging architecture with a high-sensitive monochromatic pixel set to obtain a greyscale image and a low-sensitive trichromatic pixel set to obtain colour images. Under low-light, spatial information of an output image is mainly derived from the greyscale image, whereas under photopic conditions where the high-sensitive pixels are saturated the output image is only derived from the colour images. Under mesopic conditions the output image is derived from both the colour and the greyscale images, wherein each pixel value is updated taking into account neighbouring pixel values by using a distance function and a similarity function. The similarity function provides information from both the respective colour and the greyscale image, wherein a weight of the greyscale information is determined by the fraction of saturated pixels in an image patch around the neighbour pixel whose distance and similarity is currently evaluated.

S. Chung et al.; "Removing Chromatic Aberration by Digital Image Processing"; Optical Engineering; Vol. 49(6); June 2010; suggest removing chromatic aberration by analyzing the colour behaviour on such edges that do not show chromatic aberration for evaluating a range limitation for colour difference signals. Pixel values violating the range limitation condition are identified as colour fringes caused by chromatic aberrations and are replaced with allowed values.

The object of the present invention is providing an enhanced imaging system for obtaining enhanced images at low computational effort. The object is achieved with the subject-matter of the independent claims. Further embodiments are defined in the dependent claims, respectively. Details and advantages of the invention will become more apparent from the following description of embodiments in connection with the accompanying drawings. Features of the various embodiments may be combined unless they exclude each other.

Figure 1A:
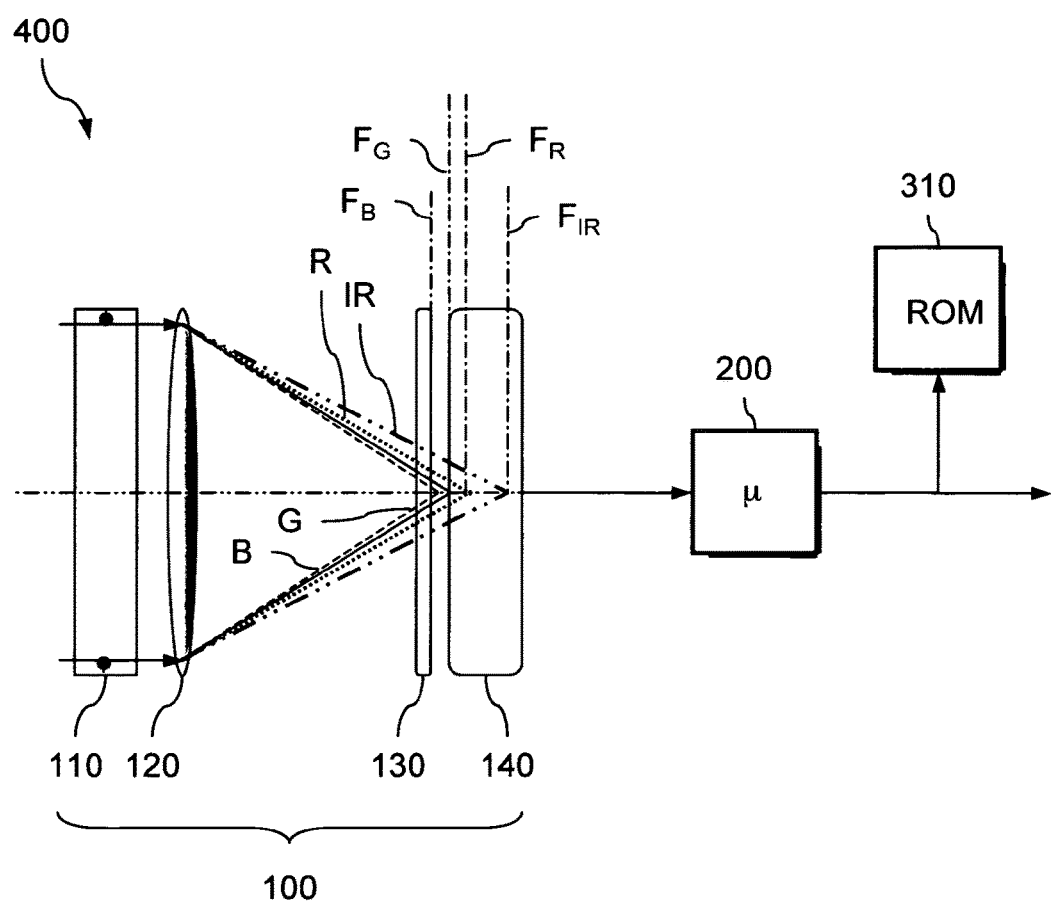
FIG. 1A is a schematic block diagram of an imaging system including an image processing unit and a non-colour-corrected lens unit with longitudinal chromatic aberrations in accordance with an embodiment of the invention.

As a convention to simplify the reading in the present text we will call any sub-ranges of the visible and the infrared (IR) radiation spectrum as 'colour'. In particular we will also call IR as a colour, even if this naming is not correct from the perspective of human vision. For example a filter transmitting only radiation in the IR spectral range will be also named 'colour filter'.

FIG. 1 shows an imaging system 400 with an imaging unit 100. The imaging system 400 may be part of a mobile or stationary camera system, for example a surveillance camera system, a camera for diagnostics or surgical methods, a camera embedded in a manufacture process control system, a digital microscope, a digital telescope, a still camera or video camera for both consumer and professional applications as well as a camera to detect gestures or poses for remote control or gaming applications. According to other embodiments, the imaging system is integrated in a handheld device including a camera system like a cellular phone, a personal digital assistant, or a music player, by way of example.

The imaging unit 100 includes an aperture unit 110, which is arranged such that radiation passing through the aperture of the aperture unit 110 passes through a lens unit 120 and incidents on an imaging sensor unit 140. The aperture unit 110 may be also positioned inside of the lens unit 120, in particular at the position of the pupil plane of the lens unit 120.

The lens unit 120 may be a single lens, an array of micro-lenses or a lens assembly including a plurality of lenses. The lens unit 120 features a longitudinal chromatic aberration and the imaging unit 100 does not contain elements compensating for the longitudinal (axial) chromatic aberration to generate colour-corrected images. For example, the lens unit 120 is a compound lens formed of a highly dispersive material like glass or plastics, where the index of refraction is a function of the wavelength of the incident light such that the focal length varies as a function of the wavelength. For example, the lens unit 120 images infrared radiation in a first focal plane $F_{IR}$, visible red light in a focal plane $F_R$, green light in a focal plane $F_G$ and blue light in a focal plane $F_B$.

According to an embodiment the lens unit 120 may include compensation elements compensating for spherical and/or field dependent aberrations such that the lens unit 120 exhibits no or only negligible spherical and field dependent aberrations.

The imaging sensor unit 140 includes a plurality of pixel sensors, wherein each pixel sensor contains a photo sensor for converting a photo signal from the incident radiation into an electronic signal. The imaging sensor unit 140 may output an image signal containing the pixel values of all pixel sensors of an imaging sensor unit 140 in a digitized form.

The imaging unit 100 may provide a greyscale image and an infrared image. According to other embodiments a colour filter unit 130 may be arranged between the lens unit 120 and the imaging sensor unit 140. The colour filter unit 130 may comprise a plurality of colour filter sections, wherein each colour filter section has a filter colour, for example blue, red, green, white or IR (infrared). Each colour filter section may be assigned to one single pixel sensor such that each pixel sensor receives colour-specific image information. The imaging sensor unit 140 outputs two, three, four or more different sub-images, wherein each sub-image contains image information with regard to a specific frequency range of the incoming radiation. One of the sub-images may describe the infrared portion of the imaged scene.

From an imaged scene, the imaging sensor unit 140 captures a plurality of non-colour-corrected first images of different spectral content or composition, for example a "red" image using the filter colour "red", a "blue" image using the filter colour "blue", and a "green" image using the filter colour "green". One of the first images may consist or contain at least a portion of the infrared range and outputs respective image signals. The images of different spectral content may also include images with overlapping spectral content. For example, the imaging sensor unit 140 may include broadband sensitive pixel sensors which are assigned to broadband colour filter sections with the filter colour "white" being approximately transparent for the whole visible spectrum. Hereinafter the first images of different spectral content are referred to as colour planes or images and may include a greyscale image containing information over the whole visible spectrum or may refer to spectral content outside the visible range, for example infrared radiation.

An image processing unit 200 receives the colour planes that contain both luminance information and colour information and computes a modified output image signal. The modified output image signal represents an image that may have reduced or enhanced depth-of-field compared to the first images, or may be a re-focused image, or an image featuring a 3D effect, by way of example.

The modified image may be stored in a non-volatile memory 310 of the imaging system 400, for example as a set of digital values representing a coloured image. The non-volatile memory 310 may be a memory card of a camera system. Alternatively or in addition, the modified image may be displayed on a display device of the imaging system 400 or may be output to another system connected to the imaging system 400 via a wired or wireless communication channel or may be supplied to a processing system or application for processing further the information contained in the modified output image.

Figure 1B:
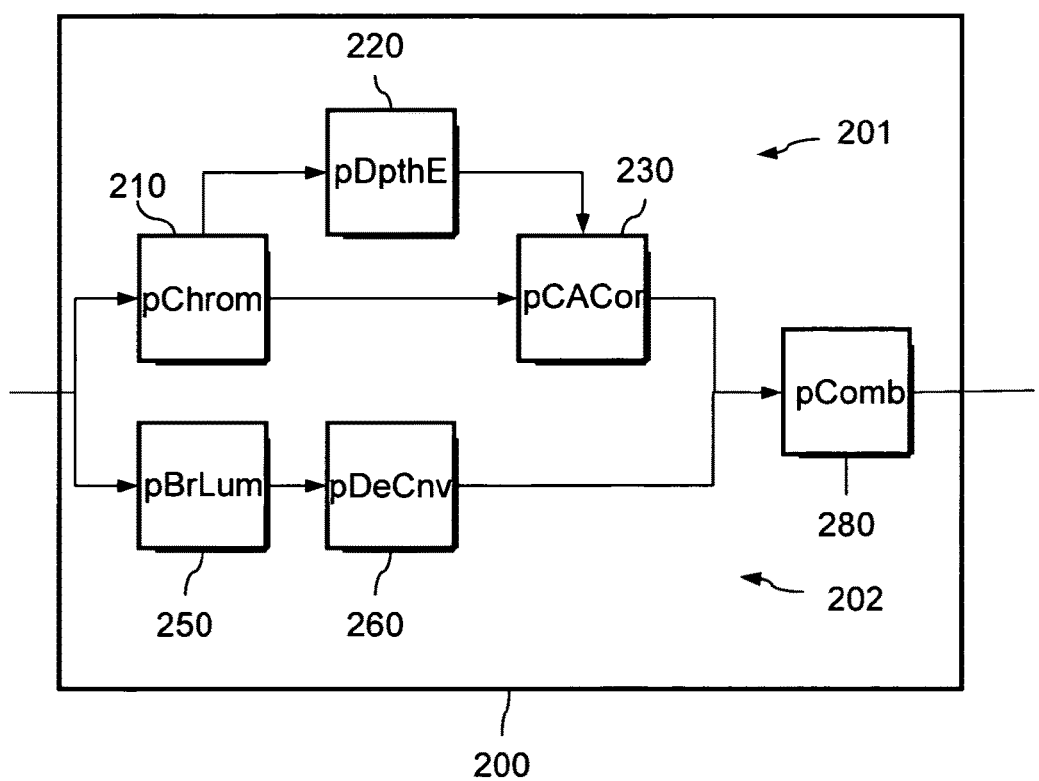
FIG. 1B is a schematic block diagram of the image processing unit of FIG. 1A.

FIG. 1B shows the image processing unit 200 in more detail. From the luminance information, an intensity processing unit 202 may compute broadband luminance sharpness information (sharp intensity information) on the basis of lens parameters, for example a PSF (point spread function), descriptive for the imaging properties of the lens unit 120. The broadband luminance corresponds to an intensity image. On the basis of the colour information, a chrominance processing unit 201 may compute chrominance information by correcting chromatic aberrations resulting from the use of the non-colour corrected lens unit 120. A synthesizer unit 280 synthesizes a modified output image on the basis of the resulting sharpness information obtained from the luminance information and on the basis of the corrected chrominance information derived from the colour information.

According to an embodiment, the intensity processing unit 202 includes a luminance pre-processing unit 250 computing a broadband luminance information on the basis of the output signals of the imaging unit 100, for example the colour planes. A deconvolution unit 260 uses information describing the lens unit 120 for computing broadband luminance sharpness information (sharp intensity information) on the basis of the broadband luminance information.

The imaging sensor unit 140 of FIG. 1A may supply inter alia a "white" colour plane or greyscale image, for example using an RGBW mosaic pattern like a 4×4 or 2×4 RGBW mosaic pattern. Then, at least under daylight conditions, the "white" colour plane may directly represent the broadband luminance information supplied to the deconvolution unit 260 and the intensity processing unit 202 computes the sharp intensity information on the basis of the "white" colour plane.

Where the imaging sensor unit 140 does not output a "white" colour plane, the luminance pre-processing unit 250 may compute a greyscale image on the basis of the colour planes and may supply the computed greyscale image as broadband luminance information to the deconvolution unit 260.

While the intensity processing unit 202 is concerned with sharp intensity information, the chrominance processing unit 201 is concerned with the colour information that may include the IR plane. Due to the chromatic aberrations of the lens unit 120, different colours focus at different distances, wherein for typical dispersive materials used for the lens unit shorter wavelengths of light focus at nearer depth than larger wavelengths. The chrominance processing unit 201 may generate a coarse depth by measuring the focus of each colour plane and comparing the obtained focus measures with each other. Based on this information the chromatic aberrations in the colour planes, which may include the IR plane, may be corrected in order to eliminate a colour bleeding effect resulting from the chromatic aberrations.

The chrominance processing unit 201 may include a chrominance pre-processing unit 210 pre-processing the colour planes, which may include an IR plane, and a depth estimator 220 for generating a depth map associating depth values to the pixel values of the colour and IR planes. A correction unit 230 corrects chromatic aberrations mainly originating from the use of the non colour-corrected lens unit 120. For example, the correction unit 230 analyzes the colour behaviour on such edges that do not show chromatic aberration for evaluating a range limitation for colour difference signals, identifies pixel values violating the range limitation as colour fringes caused by chromatic aberrations and replaces these pixel values with allowed values. According to another embodiment, the correction unit 230 may exchange sharpness information among the colour planes, for example on the basis of the depth maps.

All elements of the image processing unit 200 of FIG. 1 may be embodied by hardware only, for example as integrated circuits, FPGAs (field programmable gate arrays), ASICs (application specific integrated circuits), by software only, which may be implemented, for example in a computer program or a microcontroller memory, or by a combination of hardware and software elements.

Figure 2:
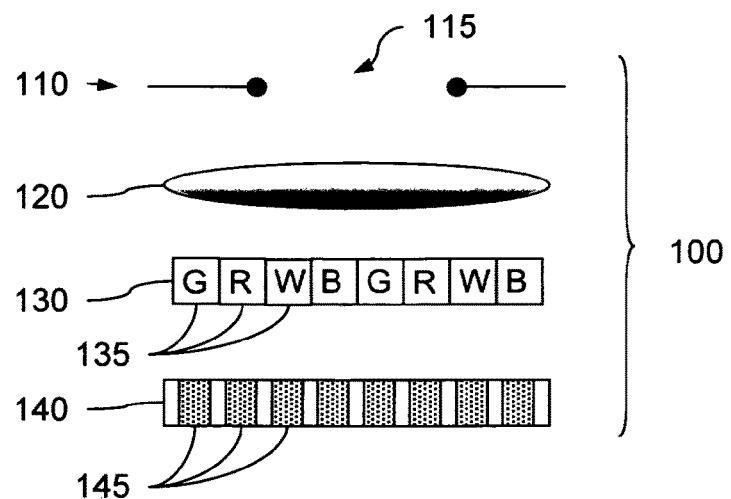
FIG. 2 is a schematic cross-sectional view of an imaging unit of an imaging system in accordance with another embodiment of the invention.

FIG. 2 refers to a schematic cross-sectional view of an imaging unit 100. The imaging unit 100 may include an aperture unit 110, wherein, during an exposure period, radiation, e.g. visible light and/or infrared radiation, which is descriptive for an image of a scene or object passes through an aperture 115 of the aperture unit 110 and a lens unit 120 and incidents onto an imaging sensor unit 140. The imaging sensor unit 140 comprises a plurality of pixel sensors 145. Each pixel sensor 145 contains a photo sensor that converts a photo signal from the incident light into an electronic signal. The pixel sensors 145 may be formed in a semiconductor substrate. The pixel sensor 145 may be arranged in one plane or in different planes. The imaging unit 100 may comprise a colour filter unit 130 that may be arranged between the lens unit 120 and the imaging sensor unit 140 or between the aperture unit 110 and the lens unit 120.

For example, the imaging sensor unit 140 may have a vertically integrated photodiode structure with deep photodiodes formed in a substrate section few microns beneath surface photodiodes formed adjacent to a substrate surface of a semiconductor substrate. Visible light is absorbed in the surface section of the semiconductor substrate, whereas infrared radiation penetrates deeper into the semiconductor substrate. As a result, the deep photodiodes only receive infrared radiation. In another example, the imaging sensor unit 140 may have a lateral integrated photodiode structure with photodiodes arranged in an array.

The colour filter unit 130 may be arranged in close contact to the imaging sensor unit 140 and may include a plurality of colour filter sections 135, wherein each colour filter section 135 has a filter colour, for example green, red, blue, magenta, yellow, white or IR (infrared). Each colour filter section 135 is assigned to one single pixel sensor 145 such that each pixel sensor 145 receives colour-specific image information. For example, the colour filter sections 135 may be arranged matrix-like in columns and rows. Colour filter sections 135 assigned to different filter colours may alternate along the row direction and the column direction in a regular manner. For example, each four colour filter sections 135 forming a 2×2 matrix may be arranged to form a Bayer mosaic pattern, wherein colour filter sections 135 with the filter colour "green" are arranged on a first diagonal of the 2×2 matrix, and one colour filter section 135 with a filter colour "red" and one colour filter section 135 with the filter colour "blue" are arranged on the other diagonal of the 2×2 matrix. With the Bayer mosaic pattern, the sampling rate for the filter colour "green" is twice that of the filter colours "red" and "blue" to take into account that the colour green carries most of the luminance information for the human eye.

According to another embodiment, the colour filter sections 135 may be arranged to form an RGBE-mosaic pattern with "Emerald" as a fourth filter colour, a CYYM mosaic pattern with one cyan, two yellow and one magenta colour filter section 135 or a CYGM mosaic pattern with one cyan, one yellow, one green and one magenta colour filter section 135 arranged in 2×2 unit matrices which are repeatedly arranged within the colour filter unit 130. According to another embodiment, the colour filter unit 130 includes a mosaic of unit matrices with three colour filter sections of three different filter colours and one transparent filter section without colour filtering properties and transparent for all colours within the visible spectrum. The transparent and the colour filter sections 135 may be arranged to form an RGBW mosaic pattern, for example a 4×4 or a 2×4 RGBW mosaic pattern, by way of example.

The filter range of the colour filter sections 135 is not restricted to the visible part of the spectrum. In accordance with an embodiment, the colour filter 130 contains at least one colour filter section type being transparent for infrared radiation. For example, the colour filter 130 is an RGBIR filter where each 2×2 unit matrix contains one red, one green, one blue and one infrared colour filter section 135 and where the unit matrices are regularly arranged to form a mosaic pattern. The four colours R, G, B and IR can be arranged by any permutation within the 2×2 unit matrices.

The infrared radiation may pass the colour filter unit 130 in sections 133 transparent for infrared radiation between the colour filter sections 135. In accordance with an embodiment, the colour filter 130 contains at least one colour filter section type being transparent for infrared radiation. For example, the colour filter 130 is an RGBIR filter where each 2×2 unit matrix contains one red, one green, one blue and one infrared colour filter section 135 and where the unit matrices are regularly arranged to form a mosaic pattern. According to other embodiments the colour filter unit 130 does not include sections assigned to the deep photodiodes, since the colour filter sections 135 may be transparent for a portion of the frequency range of infrared radiation.

Due to chromatic aberrations, each colour image blue, green, red and infrared will focus at different distances from near to far respectively such that by measuring and comparing the sharpness of each of the four image planes, a four layer depth map can be computed.

Each lens unit 120 may be realized as micro-lens array including a plurality of segments. Each lens segment of a lens unit 120 may be assigned to one single pixel sensor 145 and one colour filter section 135.

According to other embodiments, the lens unit 120 may be realized as an objective, comprising several single lenses, adapted to image objects in the object space to the sensor plane. Due to chromatic aberrations, each colour image blue, green, red and infrared will focus in another focal plane at different distances. In embodiments referring to imaging sensor units with two or more sensor planes, the distance between the first focal plane for infrared radiation and any second focal plane assigned to visible light typically does not match with the vertical distance between the first and second sensor planes. As a consequence, also in this case, at least one of the first and second images is severely out of focus when both the infrared image and the image for visible light are captured contemporaneously.

Figure 3A:
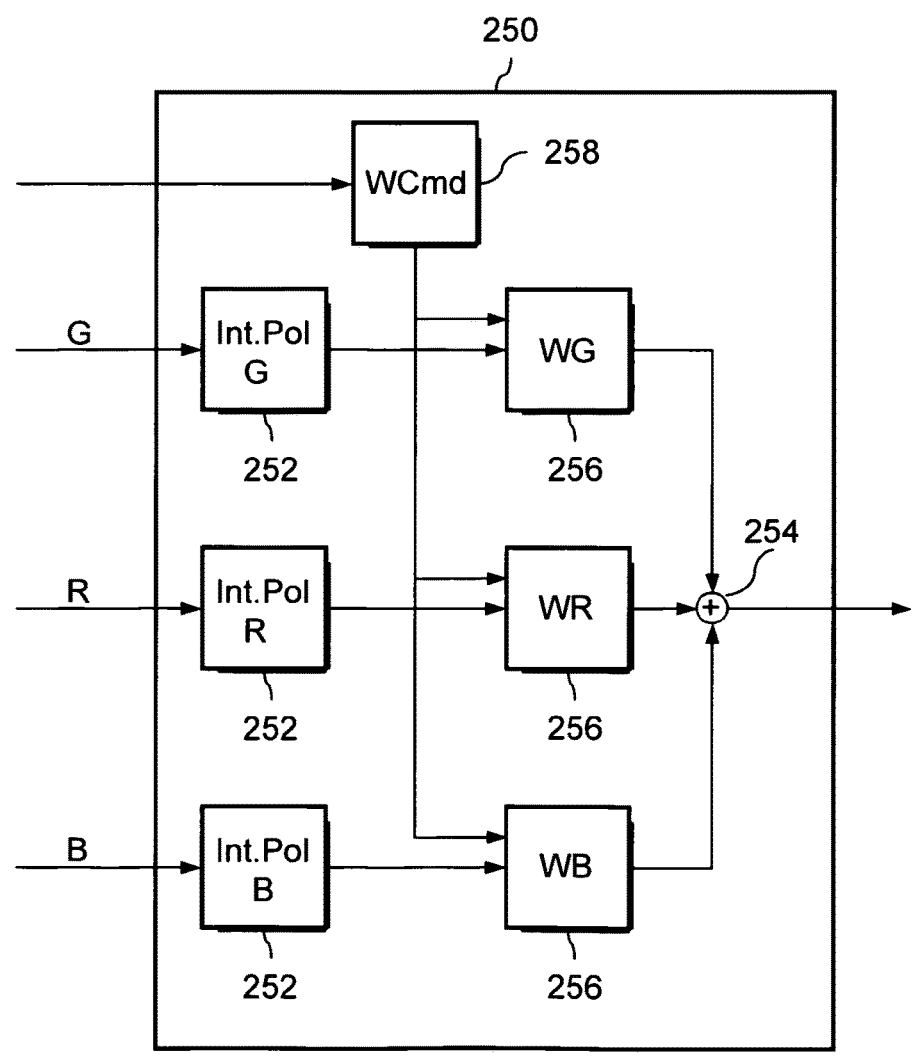
FIG. 3A is a schematic block diagram of a detail of a luminance processing unit concerning interpolation of RGB images in accordance with an embodiment.

FIG. 3A refers to an embodiment of a luminance pre-processing unit 250 which receives colour-filtered first images, for example the colour planes red, green and blue from an imaging sensor unit 140 using an RGB Bayer mosaic colour filter. According to other embodiments the imaging sensor unit 140 may be a CYGM sensor supplying the colour planes cyan, yellow, magenta and green or a CYYM sensor supplying the colour planes cyan, yellow and magenta.

The luminance pre-processing unit 250 may include, for each received colour plane an interpolation unit 252 which interpolates those pixel values for each colour plane for which the colour plane has no pixel values available since the respective pixel is assigned to another filter colour. Interpolation may be performed by estimating the missing pixel values from neighbouring pixel values of the same colour plane and/or from the corresponding pixel of other colour planes. At least embodiments where the imaging unit 100 outputs only colour channels may provide a weighting unit 256 for one, two or all of the colour channels, respectively. Each weighting unit 256 multiplies the pixel values of the colour plane it is assigned to with a specific value. A superposition unit 254 may add up the interpolated and weighted colour planes to obtain a greyscale image to be supplied to the deconvolution unit 260 of FIG. 1B. According to an embodiment referring to an RGB sensor, the computed broadband luminance may be obtained by summing up the red, green and blue colour images at equal weights, at least in the case of daylight conditions.

Each weighting unit 256 may be non-configurable and may be a wired connection for weighting a colour plane with the weight "1". Another embodiment provides configurable weighting units 256 and a weighting control unit 258 that configures the weights of the weighting units 256 as a function of the illumination conditions or in response to a user input. At least one of the weights may have the value "0". According to an embodiment, the intensity image is the weighted average of all available spectral components in the sensor plane(s) including white and infrared.

According to an embodiment, the imaging system uses information about the type of the light source illuminating the scene to select the weights for obtaining the computed broadband luminance. For example, for at least one specific type of light source, information about suitable colour weights may be stored in the weighting control unit 258, wherein the colour weights are predefined such that the spectral power density of the light source multiplied with the sum of the colour components obtained by multiplying the colour sensitivity with its respective weight, respectively, is broad and flat over the visible range of the spectrum in order to achieve a depth invariant PSF. The weighting control unit 258 may be adapted to classify a light source illuminating the imaged scene as daylight or artificial light, for example as incandescent lamp, fluorescent lamp, or LED lamp. In accordance with other embodiments, the weighting control unit 258 may process a user command indicating a light source type.

According to another embodiment, the imaging unit 100 is based on a multi-layer image sensor, where pixel sensor layers are stacked within a transparent substrate and each pixel sensor layer is sensitive to another spectral range of the incoming light taking advantage of the fact that red, green, and blue light penetrate the substrate to different depths. In such cases where the image sensor provides full-scale colour planes, for example where stacked pixel sensors are used, the interpolation unit 252 may be omitted.

Figure 3B:
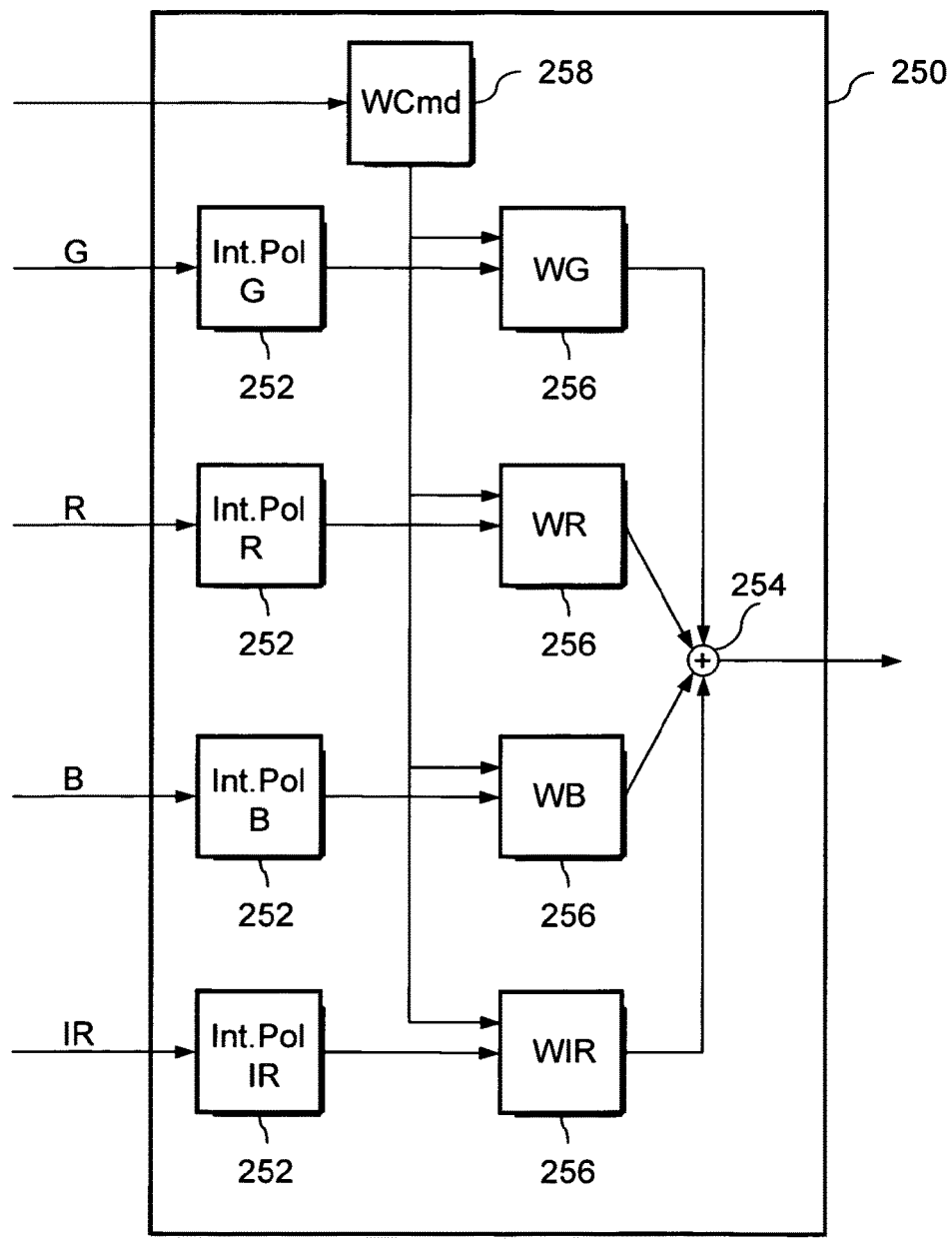
FIG. 3B is a schematic block diagram of a detail of a luminance processing unit concerning interpolation of RGBIR images in accordance with an embodiment.

FIG. 3B refers to an embodiment of a luminance pre-processing unit 250 which receives colour-filtered first images, for example the colour planes red, green, blue and infrared from an imaging sensor unit 140 using an RGBIR Bayer mosaic colour filter. According to other embodiments the imaging sensor unit 140 may be a CYGMIR sensor supplying the colour planes cyan, yellow, magenta, green and infrared or a CYYMIR sensor supplying the colour planes cyan, yellow, magenta and infrared.

The computed broadband luminance may be obtained by summing up the red, green, blue and the infrared image colour images at equal weights, at least in the case of daylight conditions.

Figure 3C:
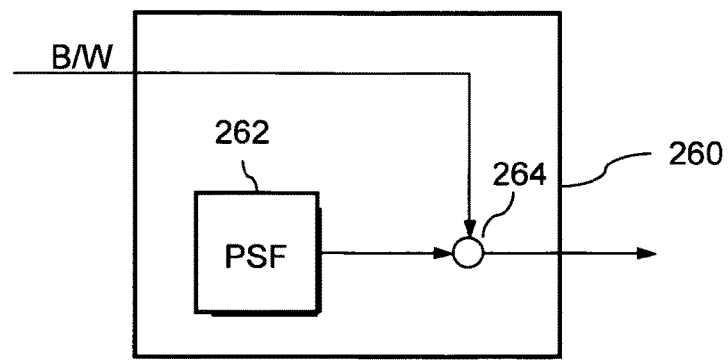
FIG. 3C is a schematic block diagram of a detail of a luminance processing unit concerning deconvolution in accordance with further embodiments of the invention.

FIG. 3C refers to an embodiment of the deconvolution unit 260. The deconvolution unit 260 receives the broadband luminance information, for example as a greyscale image, and recovers sharpness information using information descriptive for the imaging properties of the lens unit 120. According to an embodiment, the deconvolution unit 260 deconvolves the greyscale image using a PSF descriptive for the imaging properties of the lens unit 120 of FIG. 1. The point spread function may be stored in a memory unit 262. A deconvolution sub-unit 264 performs the deconvolution and outputs a greyscale image representing the sharp intensity information.

According to an embodiment of the deconvolution unit 260 of FIG. 3C, the memory unit 262 may store the in-focus PSF. According to other embodiments the memory unit 262 may store several point spread functions for different depth-of-field ranges and one of them may be selected in response to a corresponding user request. For example, the in-focus PSF and one, two or three further PSFs corresponding to user-selectable scene modes like "macro", "portrait" or "landscape" may be provided, for example, where the depth invariance of PSF is not sufficiently large.

The resulting sharp intensity information is approximately depth-invariant for larger depth of-field for such objects that have a broadband spectrum. This is the case for most of the real world objects.

Figure 4A:
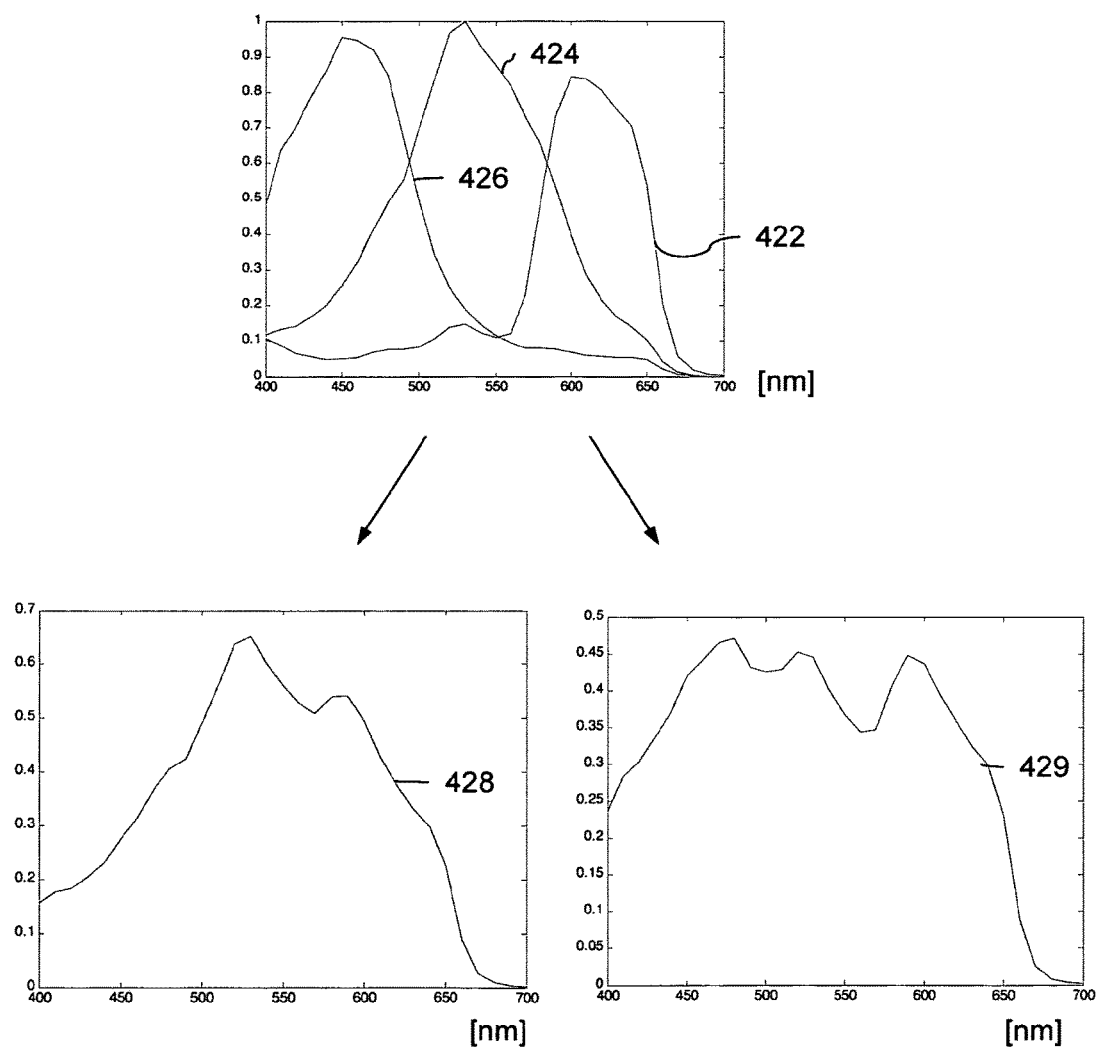
FIG. 4A shows diagrams illustrating spectral sensitivities for illustrating effects of the present invention.

FIGS. 4A to 4E refer to details and effects of the deconvolution process. In the upper half, FIG. 4A shows a first diagram with spectral sensitivities of an RGB image sensor. Curve 422 is the spectral sensitivity of a pixel assigned to the filter colour "red", Curve 424 the spectral sensitivity of a pixel assigned to the filter colour "green" and curve 426 the spectral sensitivity of a pixel assigned to the filter colour "blue". In all diagrams, spectral sensitivity is plotted as a function of the wavelength.

In the lower half, FIG. 4A shows a second diagram illustrating spectral sensitivity for "conventional" luminance 428 on the left hand side and a third diagram illustrating spectral sensitivity for broadband luminance 429. Conventionally, luminance is obtained from the RGB colour planes by RGB to YUV conversion, wherein in the YUV space, Y represents the greyscale image or luminance and UV represent two differential colour channels or chrominance, whereby the luminance is defined in a way such that it closely represents the photopic luminosity function defined by the CIE (Commission Internationale de l'Eclairage) 1931 standard. The traditional luminance Y is obtained by weighting the red signal with WR=0.299, the blue signal with WB=0.114, and the green signal with WG=0.587 and summing up the results of the three weighting operations. The conventional luminance spectral sensitivity curve 428 shown in the second diagram results from applying these weights to the spectral sensitivity curves 422, 424, 426 in the first diagram.

By contrast, the broadband luminance 429 as computed in accordance with the embodiments mainly corresponds to a white image captured by panchromatic sensor elements or a greyscale image captured through a monochrome sensor in the daylight conditions where the captured image has a broadband property. Referring to image sensors outputting only colour channels, the computed broadband luminance may be computed similar to the intensity as defined in the HSI colour space. According to an embodiment referring to an RGB sensor, the computed broadband luminance is obtained by summing up the red, green and blue colour images at equal weights in the case of day light conditions.

In illumination conditions other than daylight, the weights of the colour channels, for example the red, green, and blue channels or the red, green, blue and IR channels, may be chosen such that, given with the computing resources available in the imaging system, the final spectral sensitivity response is as broad and flat as possible within the visible spectrum in order to secure a depth invariant PSF, but at least more flat than the photopic luminosity function defined by the CIE 1931 standard. For example, the computed broadband luminance 429 is approximately flat over a wavelength range of at least 100 nm or 200 nm, wherein in the flat range the sensitivity does not change by more than 10% or 20%. According to another embodiment, an amplitude of the final spectral sensitivity response does not change by more than 50% over the half of the visible spectrum.

The broadband luminance may be obtained directly from a suitable white channel, by demosaicing the colour channels of a Bayer sensor, an RGB sensor, an RGBIR sensor, or a CYGM, CYGMIR, CYYM or CYYMIR sensor and summing up corresponding pixel values at equal weights, or by adding up the colour channels, which may include the IR channel of a stacked or multi-layer RGB or RGBIR sensor. Under other lighting conditions, the weights may be selected such that they take into account the spectral power density of the light source(s) illuminating the scene from which the image is captured, for example an incandescent light, a fluorescent lamp, or a LED lamp, such that a resulting point spread function is less depth variant than obtained by using equal weights.

Figure 4B:
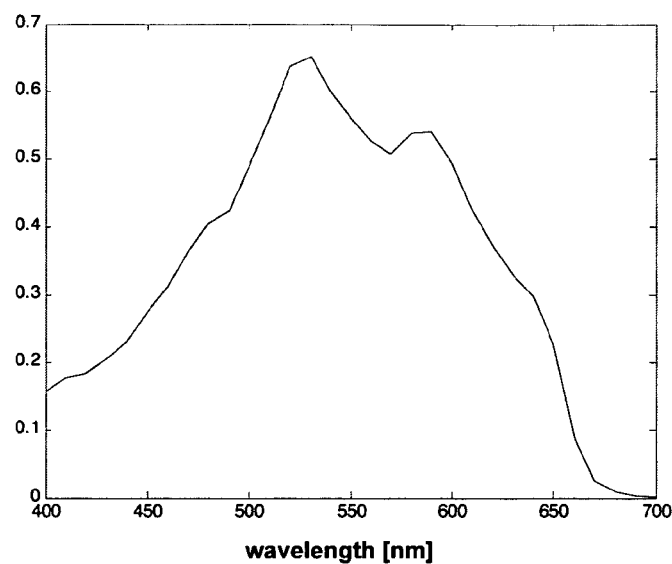
FIG. 4B shows diagrams illustrating PSF depth variance for conventional luminance for illustrating effects of the present invention.
Figure 4B:
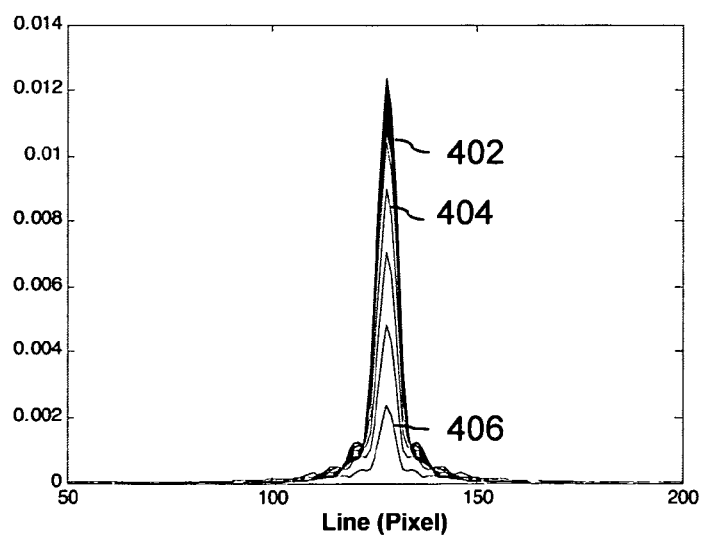
Figure 4C:
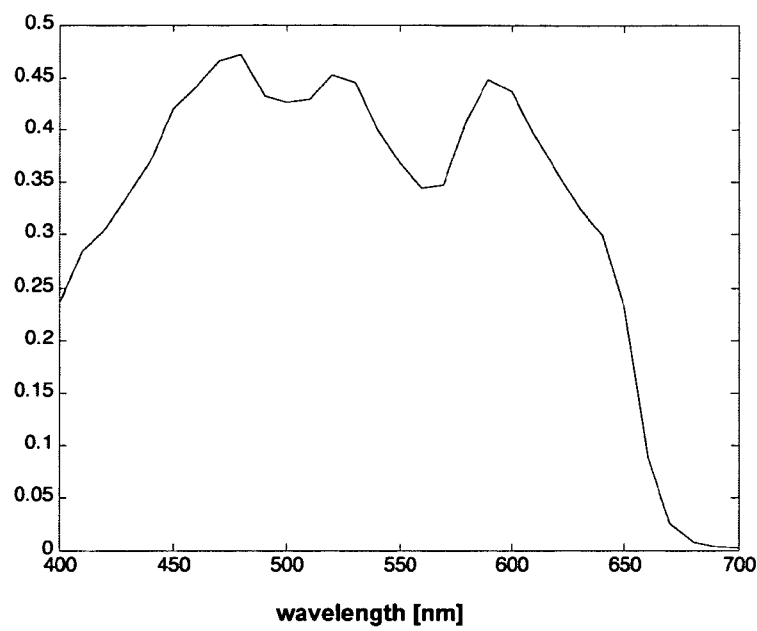
FIG. 4C shows diagrams illustrating PSF depth variance for broadband luminance for illustrating effects of the present invention.
Figure 4C:
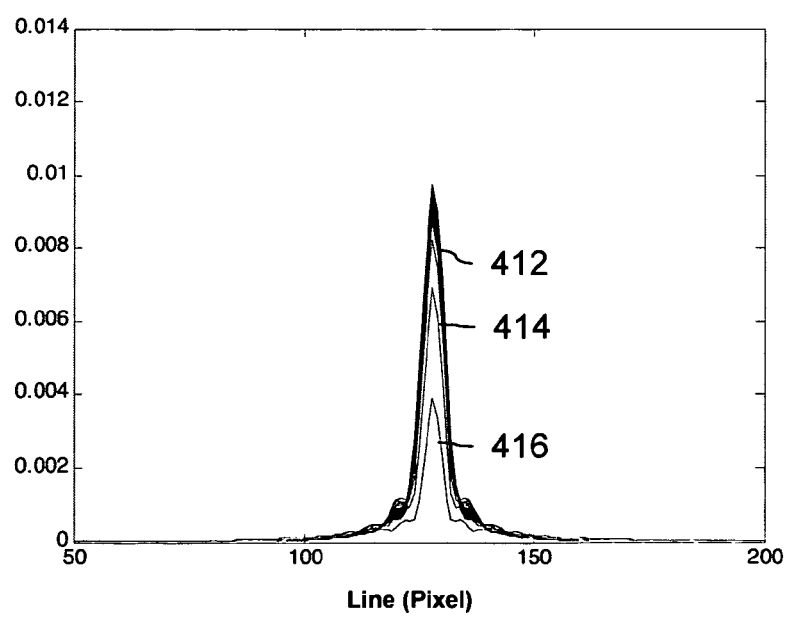

Referring to FIG. 4B, the lower half shows a family of one-dimensional PSFs 402, 404, 406 estimated for a real lens for the spectral sensitivity curve 428 given for conventional luminance in the upper half of the FIG. 4B. By contrast, FIG. 4C shows a family of one-dimensional PSFs 412, 414, 416 estimated for a real lens for the spectral sensitivity curve 429 given for broadcast luminance in the upper half of FIG. 4C. Each single PSF describes the response of the respective lens arrangement to a point source for a given distance between the point source and a lens plane in which the lens arrangement is provided. The PSF plots are from 10 cm to infinity distance.

The FIGS. 4B and 4C show that broadband luminance results in more depth invariant PSF as compared to conventional luminance. More specifically, the PSFs for near distances vary more in the case of conventional luminance. FIGS. 4B and 4C refer to daylight conditions. Under other lighting conditions, broadband luminance can be obtained by selecting appropriate weights to each colour. According to an embodiment, in incandescent light, blue has more weight than green and green more weight than red, wherein the weights are selected such that the resulting luminance has the above described "broadband luminance" characteristic.

Figure 4D:
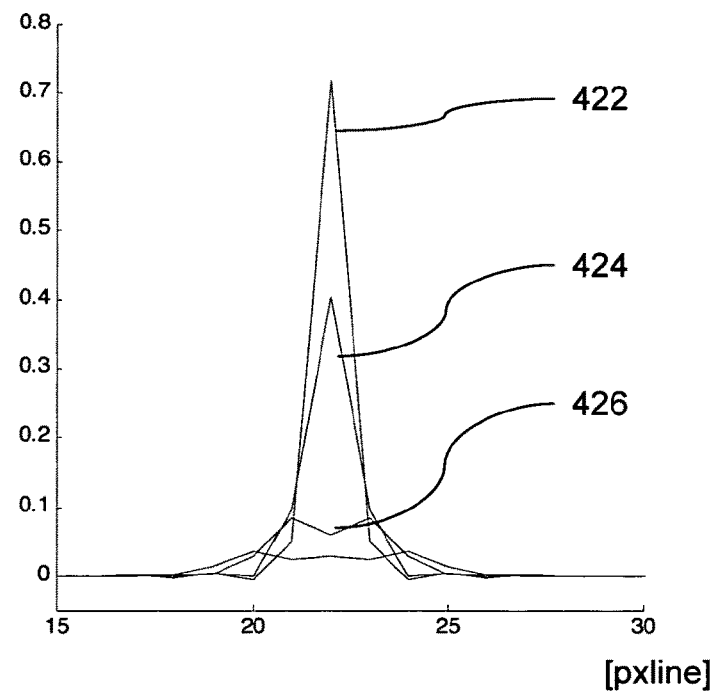
FIG. 4D is a diagram showing point spread functions for a colour-corrected lens assembly for illustrating effects underlying the invention.
Figure 4E:
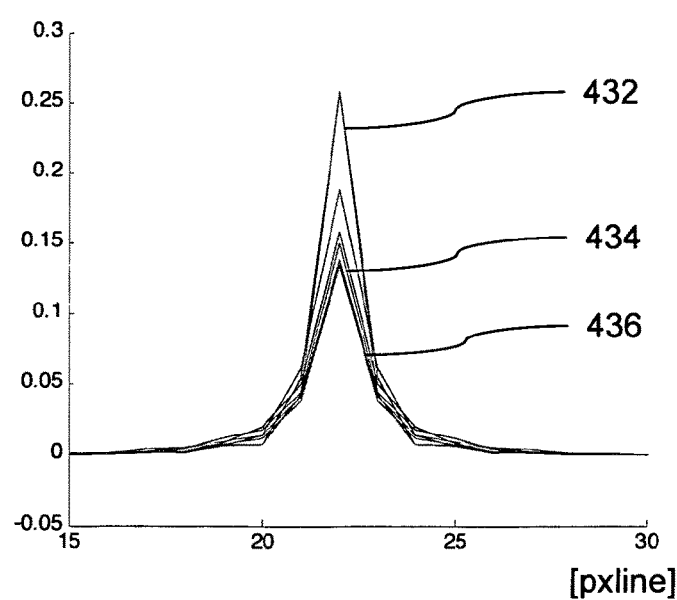
FIG. 4E is a diagram showing point spread functions for a non-colour-corrected lens assembly for illustrating effects underlying the invention.

FIG. 4D schematically illustrates a family of one-dimensional PSFs 422, 424, 426 for a conventional lens arrangement, whereas FIG. 4E refers to a family of one-dimensional PSFs 432, 434, 436 of a non-colour-corrected lens arrangement. Each single PSF describes the response of the respective lens arrangement to a point source for a given distance between the point source and a lens plane in which the lens arrangement is provided. Comparing the PSFs in both Figures shows that for a non-colour-corrected lens arrangement the PSFs for different distances deviate from each other to a significantly less degree than those for colour-corrected lens arrangements. Since the blur is approximately depth invariant over a wide range, though a lens arrangement with chromatic aberrations introduces blur, a simple deconvolution process with the a-priori known blur kernel suffices to restore sharp intensity information. According to an embodiment, that PSF that corresponds to the in-focus position is selected for deconvolution. Since the in-focus position is a symmetry position and the PSF changes similarly and only slowly for non-colour corrected lenses in both the near and far defocus position, the in-focus PSF gives optimal results.

The resulting sharp intensity information is approximately depth-invariant for larger depth of-field for such objects that have a broadband spectrum. This is the case for most of the real world objects.

Figure 4F:
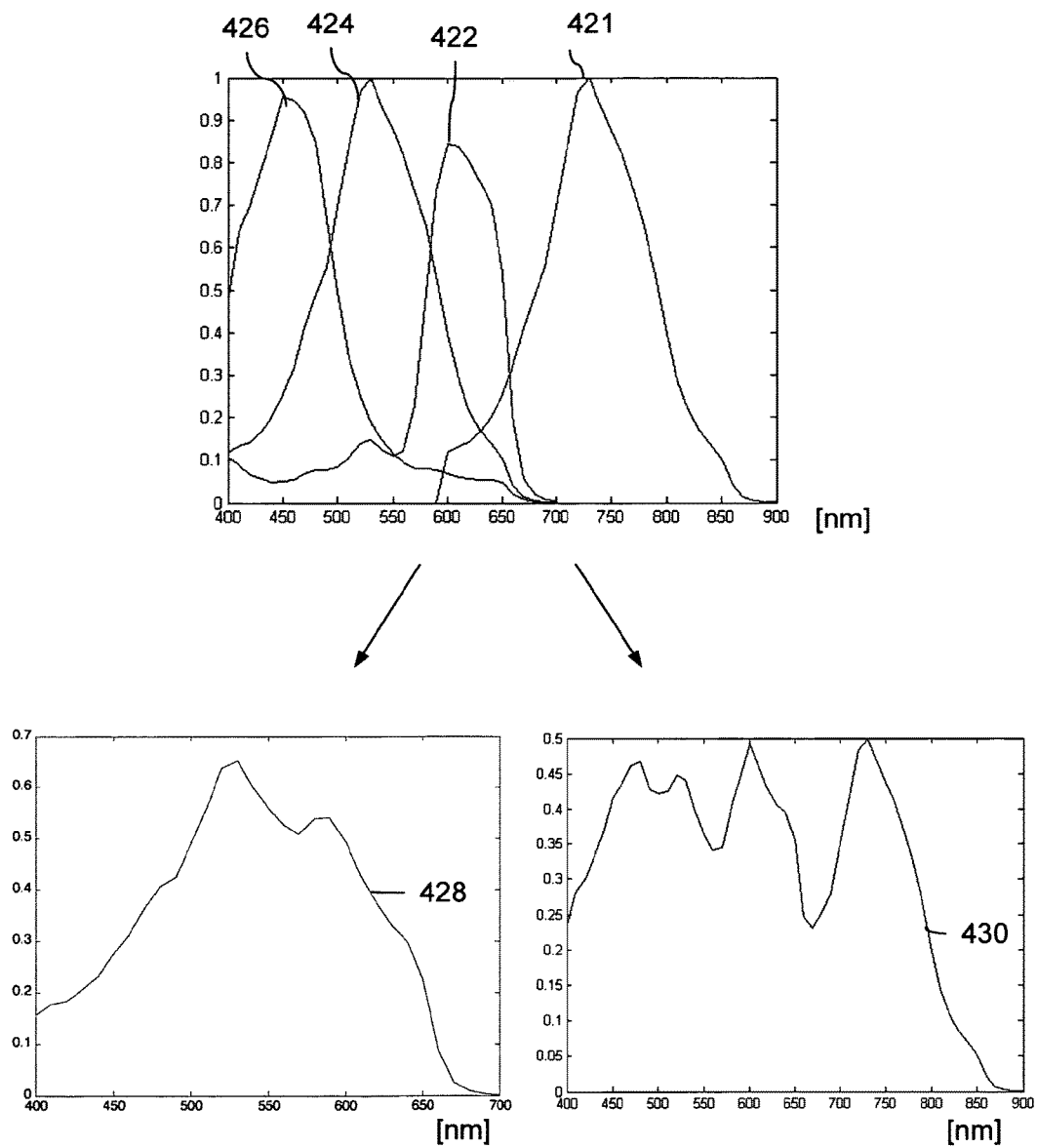
FIG. 4F shows diagrams illustrating spectral sensitivities including that of an IR sensor for illustrating effects of the present invention.

In the upper half, FIG. 4F shows a first diagram with spectral sensitivities of an RGBIR image sensor. Curve 421 is the spectral sensitivity of a pixel assigned to an IR spectral sensitivity filter. Curve 422 is the spectral sensitivity of a pixel assigned to the filter colour "red". Curve 424 is the spectral sensitivity of a pixel assigned to the filter colour "green". Curve 426 is the spectral sensitivity of a pixel assigned to the filter colour "blue". In all diagrams, spectral sensitivity is plotted as a function of the wavelength.

In the lower half, FIG. 4F shows a second diagram illustrating spectral sensitivity for "conventional" luminance 428 based on the colour planes red, green and blue on the left hand side and a third diagram illustrating spectral sensitivity for broadband luminance 430 resulting from all colour planes including infrared. The conventional luminance spectral sensitivity curve 428 shown in the second diagram results from applying these weights to the spectral sensitivity curves 422, 424, 426 in the first diagram.

By contrast, the broadband luminance 430 as computed in accordance with the embodiments mainly corresponds to a white image captured by panchromatic sensor elements or a greyscale image captured through a monochrome sensor in the daylight conditions where the captured image has a broadband property. Referring to image sensors outputting only colour channels, the computed broadband luminance may be computed similar to the intensity as defined in the HSI colour space. According to an embodiment referring to an RGBIR sensor, the computed broadband luminance is obtained by summing up the red, green and blue colour images at equal weights in the case of day light conditions.

In illumination conditions other than daylight, the weights of the colour channels, for example the red, green, blue and infrared channels may be chosen such that, given with the computing resources available in the imaging system, the final spectral sensitivity response is as broad and flat as possible within the visible spectrum in order to secure a depth invariant PSF, but at least more flat than the photopic luminosity function defined by the CIE 1931 standard. For example, the computed broadband luminance 429 is approximately flat over a wavelength range of at least 100 nm or 200 nm, wherein in the flat range the sensitivity does not change by more than 10% or 20%. According to another embodiment, an amplitude of the final spectral sensitivity response does not change by more than 50% over the half of the visible spectrum.

Figure 5A:
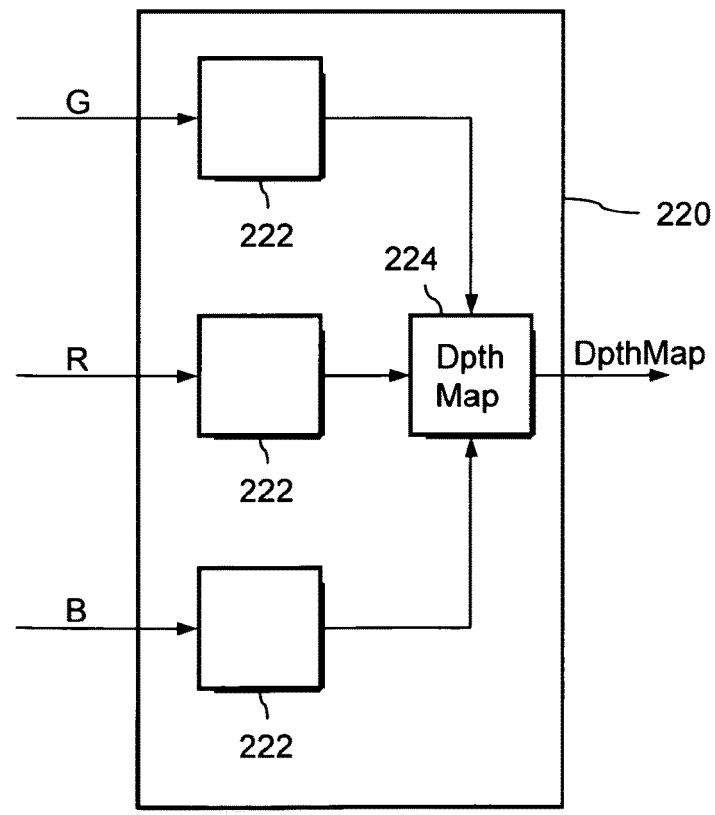
FIG. 5A is a schematic block diagram of a detail of a chrominance processing unit concerning generation of a depth map in accordance with an embodiment.

FIG. 5A refers to a depth map estimator 220 as an element of the chrominance processing unit 201 of FIG. 1B. The first non-colour-corrected sub-images or colour planes may be supplied to storage units 222 holding at least two or all of the colour planes for the following operation.

According to an embodiment, a depth map unit 224 compares relative sharpness information across the colour planes temporarily stored in the storage units 222, for example using the DCT (Discrete Cosine transform). For example, the relative sharpness between colour planes can be measured by computing, on the neighbourhood of each pixel at a given location in the colour plane, the normalized sum of differences between the local gradient and the average gradient. By estimating the sharpest colour plane for sub-regions or pixels of the imaged scene, the depth map unit 224 may generate a depth map assigning to each pixel or each group of pixels a distance information. According to an embodiment the Hadamard transform is used for sharpness measure. The results of the Hadamard transform are similar to that of the DCT but the computational effort is less since only additions and subtractions are required for performing the Hadamard transformation. Alternatively of in addition, other known sharpness measures may be used.

In accordance with another embodiment, the gradients are computed in the logarithmic domain where the normalization step may be omitted since the logarithmic domain makes the depth estimation independent of small variations in lighting conditions and small variations of intensity gradients in different colours.

The depth map may be supplied to the correction unit 230 of FIG. 1B. The correction unit 230 corrects chromatic aberrations in the colour planes. For example, the correction unit 230 evaluates a range limitation for colour differences on the basis of colour behaviour on edges that do not show chromatic aberration, identifies pixels violating the range limitation and replaces for these pixels the pixel values with allowed values. According to another embodiment, the correction unit 230 may use information included in the depth map to provide corrected colour images. For example, the correction unit 230 may perform a sharpness transport by copying high frequencies of the sharpest colour plane for the respective image region to the other colour planes. For example, to each blurred sub-region of a colour plane a high-pass filtered version of the sharpest colour plane for the respective sub-region may be added.

Figure 5B:
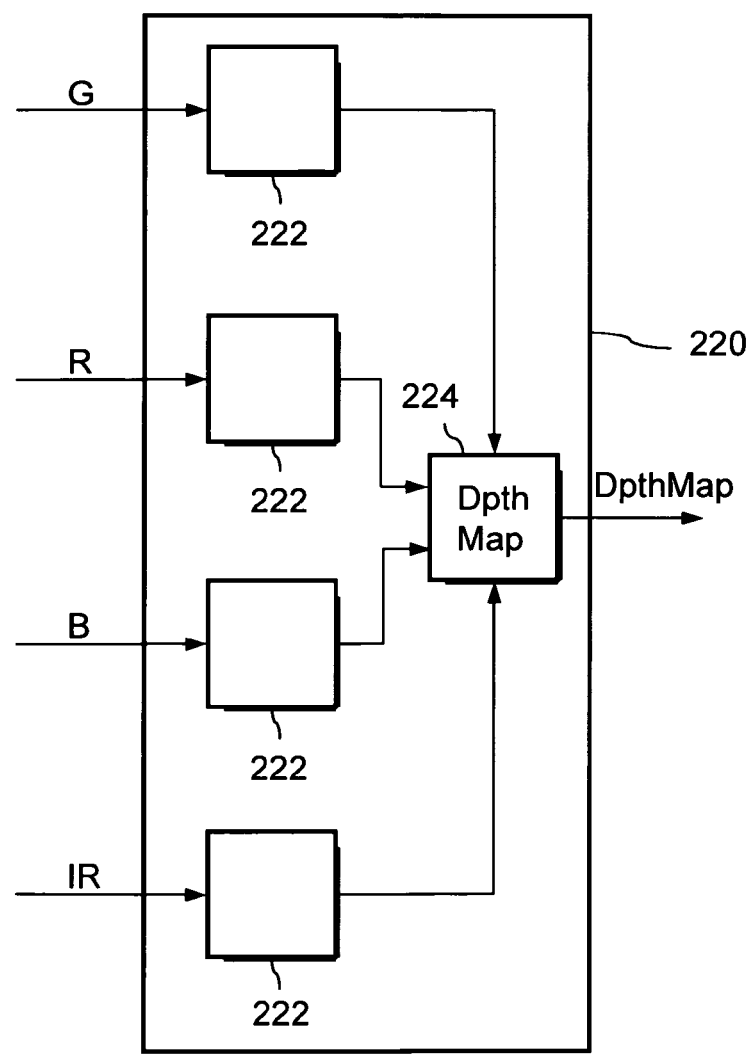
FIG. 5B is a schematic block diagram of a detail of a chrominance processing unit concerning generation of a depth map in accordance with an embodiment referring to an IR sensor.

FIG. 5B shows a depth map estimator 220 with an additional storage unit 222 for holding the IR plane.

Figure 5C:
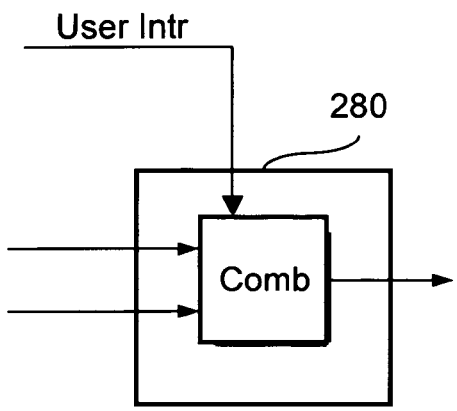
FIG. 5C is a schematic block diagram of a detail of a synthesizing unit according to a further embodiment.

FIG. 5C refers to a synthesizing unit 280 that transfers sharp intensity information into the corrected colour images output by the correction unit 230 of FIG. 1B to obtain a modified output image with extended depth of field, by way of example. According to an embodiment, the synthesizing unit 280 transfers the sharp intensity information into the corrected images on the basis of a depth map obtained, for example during chrominance information processing. For example, the sharp intensity information from the sharpest spectral component is transferred to the uncorrected spectral components. According to another embodiment, the synthesizing unit 280 transfers the sharp intensity information on the basis of the depth map and user information indicating a user request concerning picture composition. The user request may concern the implementation a post-capture focus distance selection or a focus range selection.

According to embodiments referring to RGBW or RGB-WIR image sensors, the synthesizing unit 280 may obtain the modified output image by an interleaved imaging approach, where, for example, for mesopic illumination conditions the output image is derived from both the colour images obtained from the chrominance path and the greyscale image obtained from the luminance path. For each colour plane, each pixel value is updated on the basis of neighbouring pixel values by means of a distance function and a similarity function, wherein the similarity function uses information from both the respective colour image and the greyscale image and determining a weight for the information from the greyscale image. For example, the weight may be determined by the fraction of saturated pixels in an image patch around that neighbour pixel whose distance and similarity is currently evaluated.

Figure 6A:
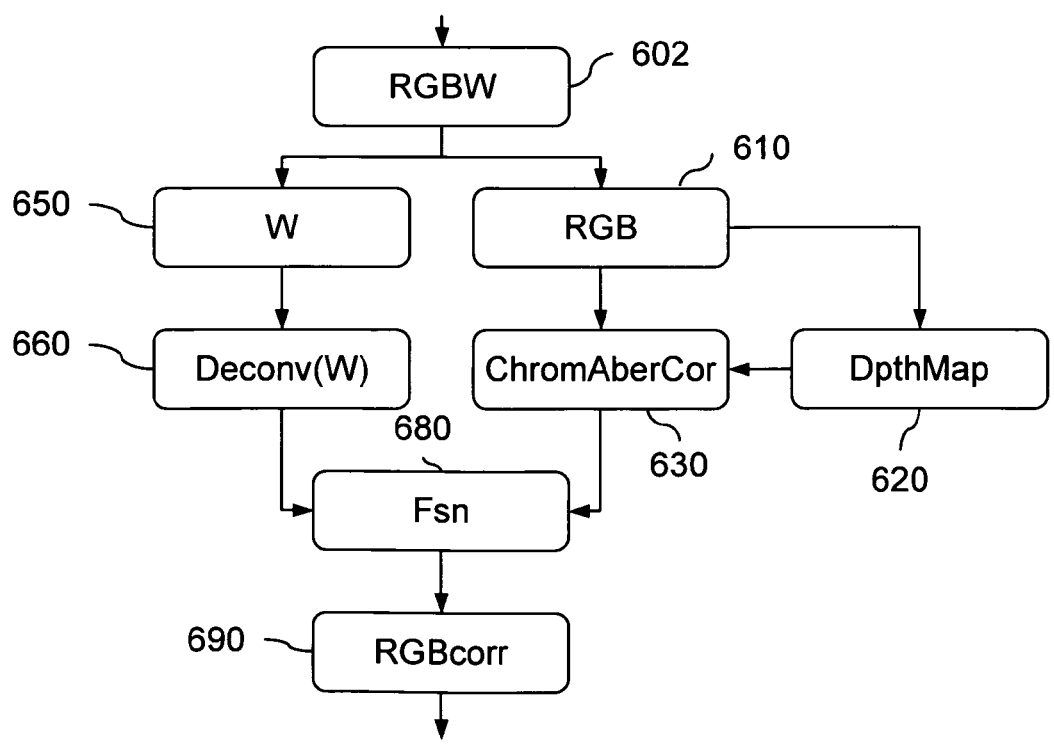
FIG. 6A is a schematic diagram illustrating a process of deriving an output image from RGBW images in accordance with an embodiment.

Other than in conventional approaches, the greyscale image to be combined with the colour images is obtained by a process taking into account the imaging properties of the non-colour corrected lens unit, for example by deconvolving a greyscale image obtained from the imaging units with the lens unit PSF, According to other embodiments referring to RGB or RGBIR image sensors, the synthesizing unit 280 obtains the output image by a similar interleaved imaging approach, wherein the greyscale image used in the similarity function may be obtained by deconvolving a light intensity obtained by a transformation of the RGB signals into the HSI (Hue-Saturation-Intensity) space. The light intensity signal or the underlying RGB images may be pre-processed to correspond to a broadband luminance signal, for which the PSF is more depth-invariant, FIG. 6A refers to an embodiment based on RGBW image sensors outputting R, G, B, and W planes (602). In a luminance path, the W plane may directly give a broadband luminance signal or may be pre-processed to represent a broadband luminance signal (650). The W plane is deconvolved using the PSF of the lens unit (660). The original R, G, B planes are provided to the chrominance path (610). Chromatic aberrations in the R, G, B planes are compensated for (630). A depth map may be derived from the original R, G, B planes (620) and used to compensate for or correct chromatic aberrations in the R, G, B planes. The deconvolved W plane is interleaved with the corrected R, G, B planes respectively (680). A modified colour image comprising modified RGB planes or equivalent information is output (690).

Figure 6B:
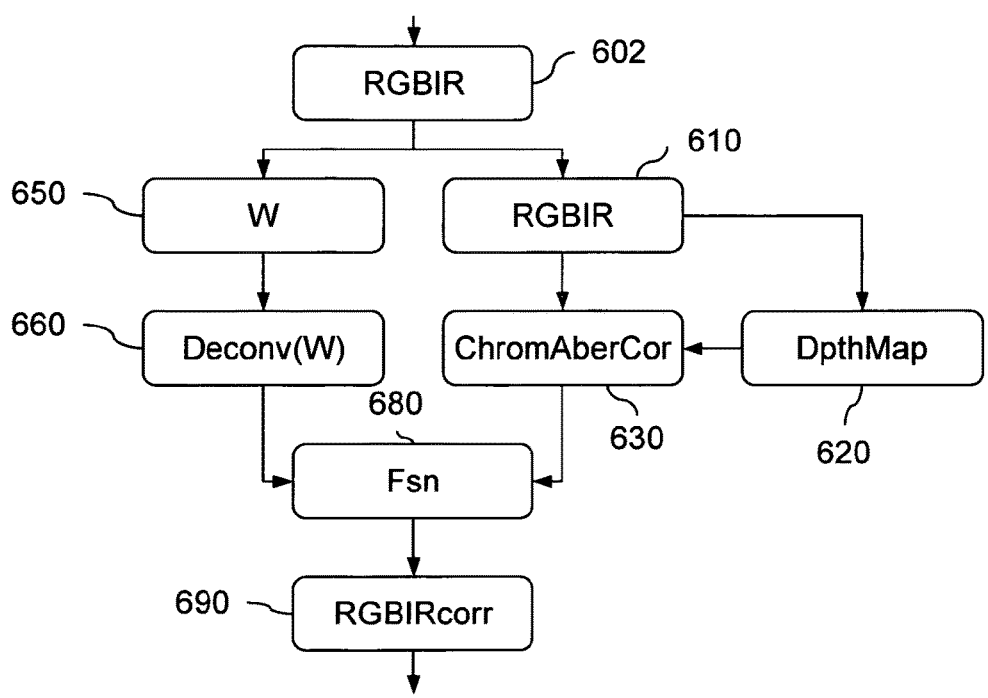
FIG. 6B is a schematic diagram illustrating a process of deriving an output image from RGBIR images in accordance with an embodiment.

FIG. 6B refers to an embodiment based on RGBWIR image sensors outputting R, G, B, IR. and W planes (602). In a luminance path, the W plane may directly give a broadband luminance signal or may be pre-processed to represent a broadband luminance signal (650). The W plane is deconvolved using the PSF of the lens unit (660). The original R, G, B, IR planes are provided to the chrominance path (610). Chromatic aberrations in the R, G, B, IR planes are compensated for (630). A depth map may be derived from the original R, G, B, IR planes (620) and used to compensate for or correct chromatic aberrations in the R, G, B, IR planes. The deconvolved W plane is interleaved with the corrected R, G, B, IR planes respectively (680). A modified colour image comprising modified R, G, B, IR planes or equivalent information is output (690).

Figure 6C:
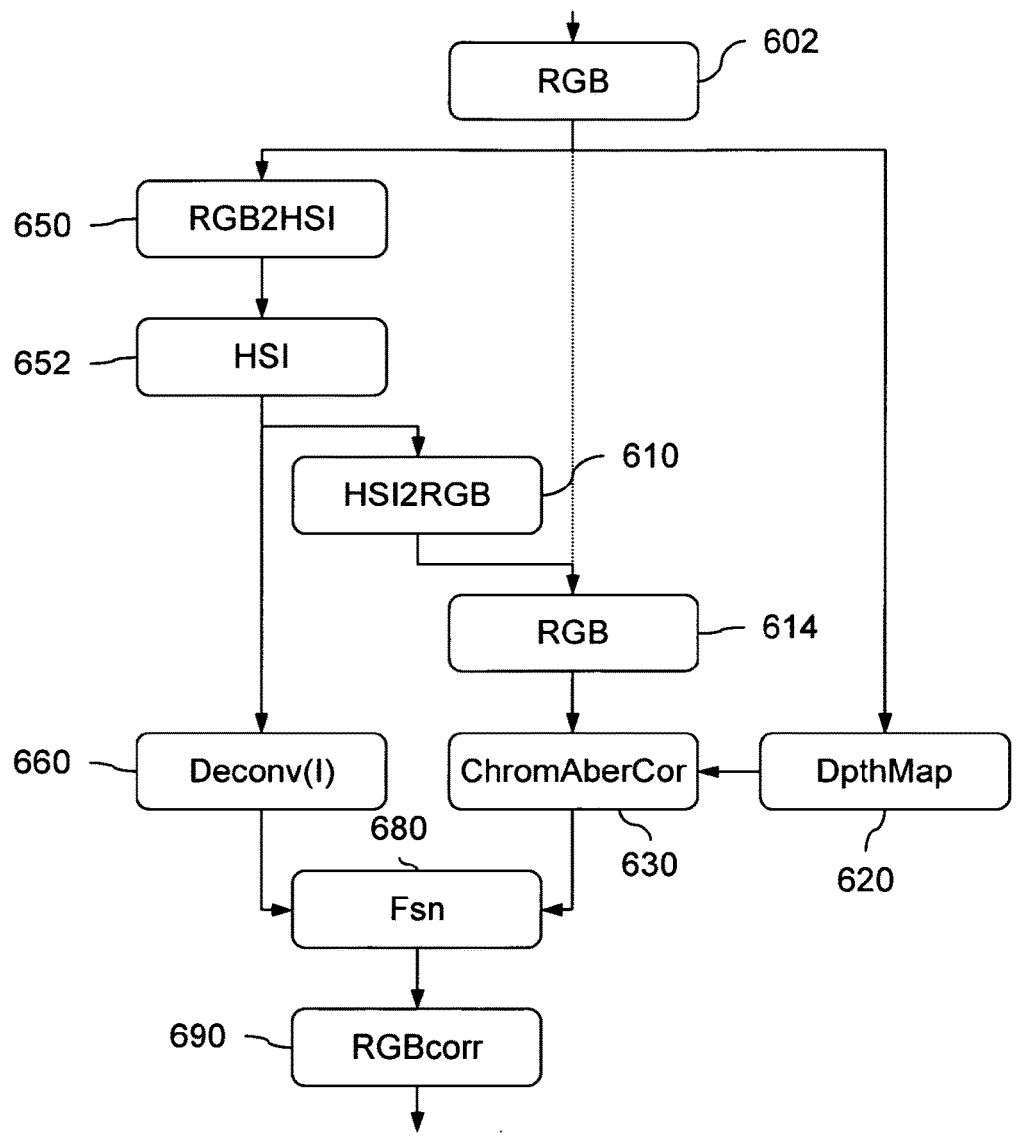
FIG. 6C is a schematic diagram illustrating a process of deriving an output image from RGB images in accordance with an embodiment.

FIG. 6C refers to an embodiment based on RGB image sensors outputting R, G, and B planes (602). The R, G, B, planes may be pre-processed, for example transformed into the HSI space (650), wherein the hue value, the saturation and the light intensity are obtained (652). The light intensity is deconvolved using the lens PSF (660). The original R, G, B planes may be provided to the chrominance path (614) or recalculated from the HSI values using the inverse HSI transformation (610). Chromatic aberrations in the R, G, B planes are compensated for (630). A depth map may be computed from the original R, G, B planes (620) and used to compensate for or correct chromatic aberrations in the R, G, B planes. The deconvolved light intensity is interleaved with the corrected R, G, B planes respectively (680). A modified colour image comprising modified RGB planes or equivalent information is output (690).

Figure 6D:
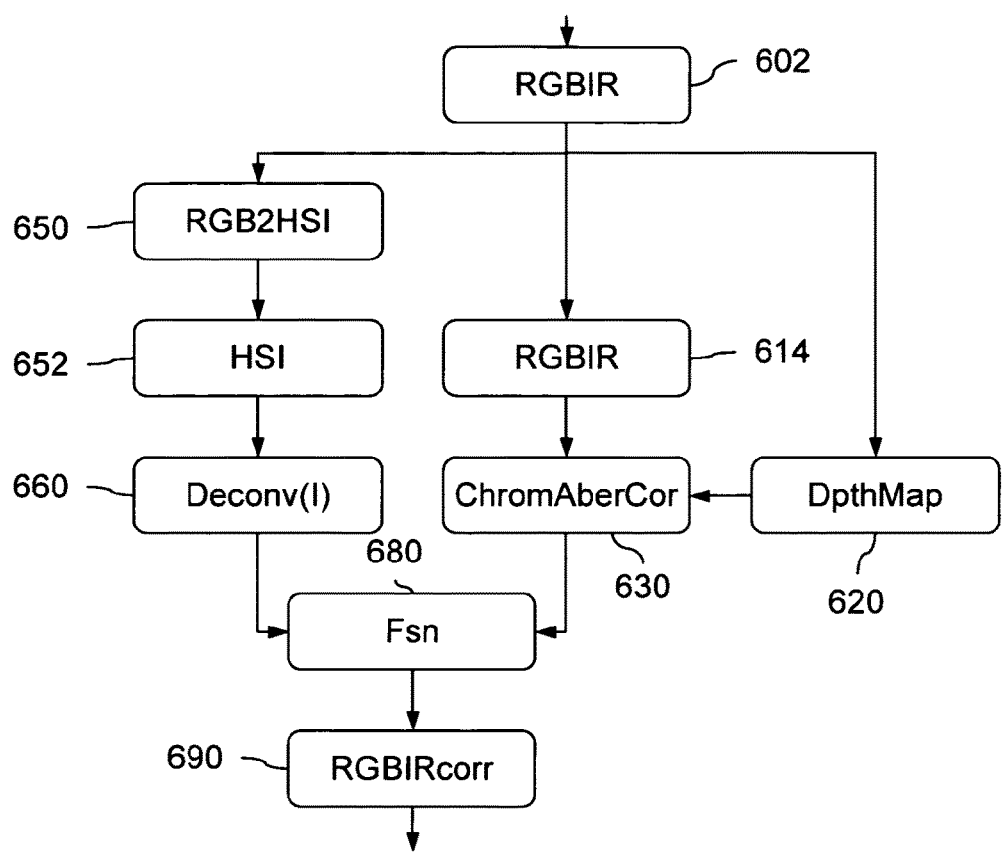
FIG. 6D is a schematic diagram illustrating a process of deriving an output image from RGBIR images in accordance with an embodiment.

FIG. 6D refers to an embodiment based on RGBIR image sensors outputting R, G, B and IR planes (602). The R, G, B planes may be pre-processed, for example transformed into the HSI space (650), wherein the hue value, the saturation and the light intensity are obtained (652). The light intensity is deconvolved using the lens PSF (660). The original R, G, B, IR planes may be provided to the chrominance path (614). Chromatic aberrations in the R, G, B, IR planes are compensated for (630). A depth map may be computed from the original R, G, B, IR planes (620) and used to compensate for or correct chromatic aberrations in the R, G, B, IR planes. The deconvolved light intensity may be interleaved with the corrected R, G, B, IR planes respectively (680). A modified colour image comprising modified R, G, B, and IR planes or equivalent information may be output (690).

Figure 7:
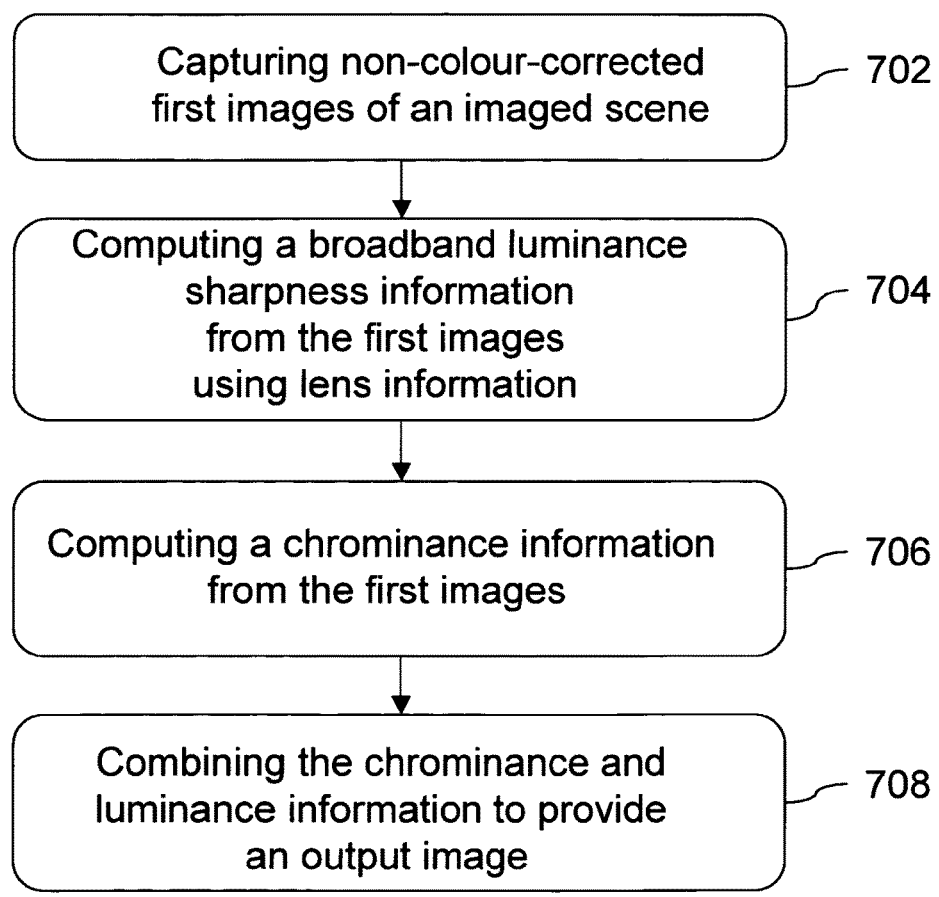
FIG. 7 is a simplified flowchart referring to a method of operating an imaging system in accordance with another embodiment of the invention.

FIG. 7 refers to a method of operating an imaging system. The method provides capturing at least two non-colour-corrected first images of an imaged scene by using a lens unit featuring longitudinal chromatic aberration, wherein the first images have different spectral components (702) and represent, by way of example, different colour planes. From the first images a broadband luminance sharpness information (704) and a chrominance information (706) is computed. The computed chrominance and broadband luminance sharpness information is combined to provide an output image (708).

Computing the broadband luminance information may include deconvolving a greyscale image derived from at least one of the non-colour-corrected first images with a point spread function descriptive for the lens unit. Computing the chrominance information may include compensating for effects of the chromatic aberrations resulting from the use of the non-colour-corrected lens unit. Combining the chrominance and broadband luminance sharpness information may be performed on the basis of an interleaving process using a similarity function based on both the chrominance and the broadband luminance sharpness information.

Where accuracy of approaches using sharpness transport between colour planes only depends on the quality of the depth estimation to a high degree, the present approach uses the PSF known for the broadband luminance channel such that extended depth-of-field or other effects can be obtained by performing a simple deconvolution. The present approach also provides correction of chromatic aberrations in the chrominance channel, wherein remaining small colour artefacts do not degrade the image quality due to the fact that the human eye is less sensitive to chrominance signal aberrations than to luminance aberrations.

On the other hand, approaches referring to spectral focal sweep loose colour information contained in the colour planes such that colour bleeding artefacts appear in the final image. At low computational effort, the present approach produces significantly better results and obtains perceptually more meaningful representations of real world scenes than the previous approaches by processing at a first stage broadband luminance sharpness information and chrominance information separately and independently from each other and combining them at a second stage.

The invention claimed is:

1. An imaging system comprising
an imaging unit that comprises a lens unit showing longitudinal chromatic aberration and an imaging sensor configured to generate, from an imaged scene, non-color-corrected first images of different spectral ranges including an infrared spectral range, the imaging sensor being a multilayer image sensor comprising a plurality of pixel sensor layers that are disposed relative to one another along a direction of light from the imaged scene propagating through the imaging sensor, each of the pixel sensor layers being sensitive to a different one of the different spectral ranges and being configured to generate a corresponding one of the first images; and
circuitry configured to
compute broadband luminance sharpness information on the basis of information descriptive for imaging properties of the lens unit, the sharpness information including at least sharpness information for the infrared spectral range,
compute chrominance information on the basis of the first images by generating a depth map from the first images, evaluating a range limitation for color differences from the depth map, and correcting chromatic aberrations in the first images in accordance with the range limitation to produce corrected images, and
provide an output image based on the chrominance and broadband luminance sharpness information.

2. The imaging system of claim 1, wherein
the circuitry is configured to output a greyscale image and to compute the broadband luminance sharpness information on the basis of the greyscale image.

3. The imaging system of claim 1, wherein the circuitry is configured to
supply at least two color-filtered first images,
generate a greyscale image or intensity function from the at least two color-filtered first images, and
compute the broadband luminance sharpness information on the basis of the generated greyscale image.

4. The imaging system of claim 2, wherein the circuitry is configured to
apply a selectable weight to one of the first images, and select the weight in response to a user input or an evaluation of the first images.

5. The imaging system of claim 2, wherein
the circuitry is configured to compute the broadband luminance sharpness information by deconvolving the greyscale image with a point spread function descriptive for the lens unit.

6. The imaging system of claim 1, wherein
the circuitry is configured to transfer sharpness information from the broadband luminance sharpness information into the corrected images.

7. The imaging system of claim 1, wherein
the circuitry is configured to transfer sharpness information from the broadband luminance sharpness information into the corrected images on the basis of the depth map.

8. The imaging system of claim 1, wherein
the circuitry is configured to interleave corrected images obtained from the chrominance processing unit and a greyscale image, wherein for each corrected image, a pixel value is updated on the basis of neighboring pixel values by means of a distance function and a similarity function, the similarity function using information from both the respective corrected image and the greyscale image and determining a weight for the information from the greyscale image.

9. The imaging system of claim 7, wherein
the circuitry is configured to transfer sharpness information further on the basis of a user request, and
the user request concerns one or more items selected from the group including implementation of a 3D-effect, focus distance selection and focus range selection.

10. The imaging system of claim 1, wherein
the imaging system is provided in a camera system, a digital telescope, or a digital microscope.

11. A method of operating an imaging system, the method comprising
capturing, using circuitry, at least two non-color-corrected first images of an imaged scene using a lens unit showing longitudinal chromatic aberration and an imaging sensor configured to generate the first images, the first images having different spectral ranges including an infrared spectral range, the imaging sensor being a multilayer image sensor comprising a plurality of pixel sensor layers that are disposed relative to one another along a direction of light from the imaged scene propagating through the imaging sensor, each of the pixel sensor layers being sensitive to a different one of the different spectral ranges and being configured to generate a corresponding one of the first images;
computing, using the circuitry, a broadband luminance sharpness information from information descriptive for imaging properties of the lens unit, the sharpness information including at least sharpness information for the infrared spectral range,
computing, using the circuitry, a chrominance information from the first images by generating a depth map from the first images, evaluating a range limitation for color differences from the depth map, and correcting chromatic aberrations in the first images in accordance with the range limitation to obtain corrected images, and
providing, using the circuitry, the chrominance and broadband luminance sharpness information.

12. The method of claim 11, wherein
computing the broadband luminance sharpness information comprises deconvolving a greyscale image derived from at least one of the first images using a point spread function descriptive for the lens unit.

13. The imaging method of claim 11, wherein
computing the broadband luminance sharpness information comprises weighting the first images with weights, the weights being selected in response to an illumination condition such that a resulting point spread function is less depth variant than obtained by using equal weights under illumination conditions other than daylight.

14. The imaging method of claim 11, wherein
combining the chrominance and luminance information comprises interleaving the corrected images representing the chrominance information and a greyscale image representing the broadband luminance sharpness information, wherein for each corrected image, a pixel value is updated on the basis of neighboring pixel values by means of a distance function and a similarity function, the similarity function using information from both the respective corrected image and the greyscale image and determining a weight for the information from the greyscale image.

15. An image processing apparatus comprising
circuitry configured to
receive non-color-corrected first images of different spectral ranges including an infrared spectral range, the first images being taken using a lens unit showing longitudinal chromatic aberration,
compute broadband luminance sharpness information on the basis of information descriptive for imaging properties of the lens unit, the sharpness information including at least sharpness information for the infrared spectral range,
compute chrominance information on the basis of the first images by generating a depth map from the first images, evaluate a range limitation for color differences from the depth map, and correcting chromatic aberrations in the first images in accordance with the range limitation to produce corrected images, and
provide an output image based on the chrominance and broadband luminance sharpness information.

16. The imaging system of claim 1, wherein computing the broadband luminance sharpness information comprises weighting the first images with weights, the weights being selected in response to an illumination condition to cause a resulting spectral sensitivity response to be flatter than obtained by using equal weights under illumination conditions other than daylight.

* * * * *